Patented May 4, 1926.

1,583,372

UNITED STATES PATENT OFFICE.

JOHN GEORGE SCHUDEL, OF BUFFALO, NEW YORK, ASSIGNOR TO NATIONAL ANILINE & CHEMICAL COMPANY, INC., OF NEW YORK, N. Y., A CORPORATION OF NEW YORK.

PURIFICATION OF PHENOLPHTHALEIN.

No Drawing.  Application filed February 5, 1923. Serial No. 617,162.

*To all whom it may concern:*

Be it known that I, JOHN GEORGE SCHUDEL, a citizen of Switzerland, and residing at Buffalo, in the county of Erie, State of New York, have invented certain new and useful Improvements in the Purification of Phenolphthalein; and I do hereby declare the following to be a full, clear, and exact description of the invention, such as will enable others skilled in the art to which it appertains to make and use the same.

This invention relates to an improved method of purifying phenolphthalein.

In the production of phenolphthalein by the condensation of phthalic anhydride with phenol in the presence of condensing agents, such as concentrated sulfuric acid, zinc chloride, stannic chloride, etc., considerable amounts of tarry by-products are usually formed which interfere with the subsequent refining or purification of the phenolphthalein.

In addition to such tarry by-products there is also usually produced a more or less amount of other by-products, for example, such as fluorane, hydroxyanthraquinone bodies, etc. A well known method of procedure for purifying phenolphthalein is to treat the condensation reaction mixture with water and, with or without a preliminary steam distillation, filter off the crude phthalein and wash it with water. It is then dissolved in caustic soda solution, filtered from the undissolved residue which usually consists mostly of fluorane bodies, and the filtrate acidified with hydrochloric or sulfuric acid to precipitate the phthalein, which is then filtered off, washed with water, and subsequently purified.

It has been heretofore proposed to purify phenolphthalein, substantially freed from fluorane bodies, by crystallization from organic solvents using, in many cases, animal charcoal to decolorize the solution. Methyl or ethyl alcohol, acetone, acetic acid, etc., have been suggested as organic solvents. Concentrated sulfuric acid has been also suggested as a solvent, the solution being subsequently poured into water to precipitate the phthalein. Fractional crystallization and fractional precipitation of the phenolphthalein from solution have also been proposed. The disadvantages of the heretofore proposed methods of purifying phenolphthalein are in their ineffectiveness to produce a product substantially white in color, and substantially free from resinous material, and one which melts within a desired range of temperature without entailing a considerable loss of material due, in part, either to the difficulties involved in carrying out such processes or to the large number of repeated purifications necessary to produce an acceptable product. The present invention relates to certain improvements upon such prior processes.

According to the present invention, the impure phenolphthalein is purified by subjecting it to the action of reducing agents, for example, zinc dust, in the presence of an organic solvent such as alcohol, and the phenolphthalein is recovered from the resulting solution. The impure phenolphthalein is advantageously dissolved in caustic alkali solution, and the solution separated from the insoluble residue before the addition of the alcohol and reducing agent. The use of the reducing agent, such as zinc dust, is also advantageously combined with the use of decolorizing charcoal.

In carrying out the present invention, the alkaline solution of the crude phenolphthalein, freed by filtration from undissolved material, is either added, with stirring, to an excess of dilute sulfuric or hydrochloric acid or it is diluted with alcohol and the alcoholic aqueous solution rendered distinctly but not strongly acid by the addition of sulfuric or hydrochloric acid. The mixture is then stirred until the precipitated phthalein, if in the form of an oil, is converted into a solid. The product is filtered off and washed with water. The dried product is then dissolved in about five times its weight of alcohol, the solution is made faintly acid by the addition of a small amount of hydrochloric acid, a small amount of decolorizing charcoal and a small amount of a reducing agent, preferably zinc dust, is added, and the well-stirred mixture boiled under a reflux condenser for several hours. It is then filtered and the filtrate evaporated to a volume equal to about one-third of the original volume. It is then allowed to cool slowly, with stirring, to room temperature. The product which crystallizes out is then filtered off and washed with alcohol to free it from adhering mother-liquor. The product thus obtained is substantially free from colored impurities, and is substantially pure. The mother-liquor may be further evaporated and a second and third fraction of purified material obtained.

The invention will be further illustrated by the following sample, but it is understood that the invention is not limited thereto. The parts are by weight.

Example: 250 parts of crude phenolphthalein, obtained by the condensation of phthalic anhydride with phenol in the presence of concentrated sulfuric acid, is dissolved in 425 parts of a 15 per cent caustic soda solution, and the solution filtered from the insoluble material which consists mostly of fluorane bodies. About 15-16 parts of insoluble material is filtered off and it is washed with a little water. The filtrate is then added, with stirring, to 160-165 parts of iced 50 per cent sulfuric acid or there is added to the filtrate 100-110 parts of denatured alcohlol (United States Internal Revenue, Regulations No. 30, Revised; Formula No. 2b) and sufficient 50 per cent sulfuric acid to give the solution a distinct acidity. The phenolphthalein separates as a solid or as an oil which afterward changes to a solid upon stirring and cooling the mixture. The product is filtered off, washed with water, and dried.

235 parts of the dried product is then dissolved in 1415 parts denatured alcohol (as above) and the solution made faintly acid (toward Congo red test paper) by the addition of hydrochloric acid. Twelve to twenty-five parts of a highly effective charcoal known under the trade name of superfiltchar and 3.6 parts of zinc dust are added and the mixture heated, while stirring, under a reflux condenser for 12-15 hours. It is then cooled, filtered, and the residue washed with about 200 parts of alcohol. The solution is then evaporated by distillation until about 1145 parts alcohol are recovered (that is, until two-thirds of the alcohol originally taken and all of the alcohol used for washing are distilled off). No crystallization from solution should occur during this evaporation otherwise the desired purification will not take place readily, if at all. In case any product crystallizes out at this point, sufficient alcohol should be added to effect solution and the evaporation repeated. The concentrated solution, free from crystals, is then slowly cooled, with stirring. The phenolphthalein which crystallizes out is filtered off, washed with alcohol until it is practically free from adhering mother-liquor and dried. It is practically white in color.

The mother-liquor is then carefully evaporated by distillation, using the same precautions against crystallization as before, until a solution containing about 1⅔ parts alcohol to 1 part phenalphthalein is obtained, and the solution allowed to cool as before. A second fraction of crystals is obtained of approximately the same purity as the first fraction. Upon further evaporation of the mother-liquor additional fractions may be obtained but, as a rule, these are not pure and are subjected to purification as is crude material.

If desired, the first and second set of crystals may be mixed and the mixture recrystallized as before from alcohol whereby phenolphthalein is obtained in a substantially pure state, white in color, and having a melting-point of about 253-256° C.

The various other fractions may be added to and treated as crude material and in this way most, if not all, of the phenolphthalein is finally obtained in a purified state with very little loss.

It will be noted that 5 parts or more of alcohol are taken to dissolve the phenolphthalein and that all crystallizations take place from solutions containing approximately 1⅔ parts of alcohol to 1 part of phenolphthalein. It will be further noted that the purification is not only effected by the use of a decolorizing charcoal but also by the use of zinc dust. Without the use of zinc dust it is very difficult, if not impossible, to obtain a decolorized and substantially white phenolphthalein. Other reducing agents, such as aluminum powder, aluminum amalgam, magnesium, tin, stannous chloride, etc., may also be used but zinc is preferred and advantageous. Pure ethyl alcohol or ethyl alcohol denatured according to other formulas may be used. Other alcohols, such as methanol, propanol, butanol, etc., may also be employed. Also other organic solvents, such as acetone, glacial acetic acid, etc., and other decolorizing charcoals or carbons, may be employed. It will be further noted that the alcohol, or other solvent, may be recovered and used in subsequent purifications.

Phenolphthalein made by the use of condensing agents other than sulfuric acid, and also other impure phthaleins, such as tetrachlorphenolphthalein, etc., may be purified in a similar manner.

It will thus be seen that the present invention provides an improved process for the purification of impure phenolphthalein and makes it possible to obtain a substantially pure product, free from colored impurities, and without undue loss of large amounts of material.

I claim:

1. The method of purifying impure phenolphthalein which comprises subjecting impure phenolphthalein to the action of reducing agents in the presence of an acidified organic solvent, separating the solution from the insoluble residue, and from the solution crystallizing the purified phthalein.

2. The method of purifying impure phenolphthalein which comprises subjecting an acidified alcoholic solution of impure phenolphthalein to the action of zinc dust, separating the solution from the insoluble residue, and recovering the purified phthalein from the solution by crystallization therefrom.

3. The method of purifying impure phenolphthalein which comprises subjecting a hot acidified alcoholic solution of impure phenolphthalein to the action of zinc dust, separating the solution from the insoluble residue, and recovering the purified phenolphthalein from solution by crystallization therefrom.

4. The method of purifying impure phenolphthalein which is substantially free from fluorane bodies which comprises subjecting a hot acidified alcoholic solution of impure phenolphthalein to the simultaneous action of decolorizing charcoal and zinc dust, separating the solution from the insoluble residue and from the solution recovering the purified phenolphthalein by crystallization.

5. The method of purifying an impure phenolphthalein which is substantially free from fluorane bodies which comprises subjecting an acidified alcoholic solution of impure phenolphthalein to the action of decolorizing charcoal and to zinc dust, separating the solution from the insoluble residue, evaporating the solution to a volume which contains approximately 1½ to 2 parts of alcohol to 1 part of phenolphthalein, and allowing the solution to cool, with stirring, whereby phenolphthalein is recovered by crystallization and filtration therefrom in a substantially pure state.

6. In the method of purifying an impure phenolphthalein which is substantially free from fluorane bodies, the step which comprises subjecting the impure phenolphthalein to the reducing action of zinc dust in the presence of acid.

7. In the method of purifying an impure phenolphthalein, the step which comprises subjecting the impure phenolphthalein to the combined action of decolorizing charcoal and zinc dust in the presence of acid.

8. In the method of purifying impure phenolphthalein in the presence of an acified organic solvent, the step which comprises subjecting the impure phenolphthalein to the action of a reducing agent.

9. In the method of purifying impure phenolphthalein by solution and subsequent crystallization from an alcoholic medium, the step which comprises subjecting the impure phenolphthalein after solution but before crystallization to the action of zinc in the presence of acid.

In testimony whereof I affix my signature.

JOHN GEORGE SCHUDEL.